US009680574B1

(12) United States Patent
Krishnan et al.

(10) Patent No.: US 9,680,574 B1
(45) Date of Patent: Jun. 13, 2017

(54) FREQUENCY DOMAIN OPTICAL CHANNEL ESTIMATION

(71) Applicant: Futurewei Technologies, Inc., Plano, TX (US)

(72) Inventors: Murali Krishnan, San Diego, CA (US); Qing Guo, Dublin, CA (US); Samina Chowdhury, San Jose, CA (US); Fei Zhu, Coral Gables, FL (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/954,473

(22) Filed: Nov. 30, 2015

(51) Int. Cl.
*H04B 10/61* (2013.01)
*H04B 3/06* (2006.01)
*H04B 1/04* (2006.01)
*H04B 10/2513* (2013.01)
*H04B 10/2569* (2013.01)
*H04L 25/02* (2006.01)

(52) U.S. Cl.
CPC ..... *H04B 10/2513* (2013.01); *H04B 10/2569* (2013.01); *H04L 25/022* (2013.01)

(58) Field of Classification Search
None
See application file for complete search history.

(56) References Cited

U.S. PATENT DOCUMENTS

| 7,769,305 B1 * | 8/2010 | Roberts | H04B 10/60 398/152 |
| 8,005,368 B2 * | 8/2011 | Roberts | H04B 10/677 398/147 |

(Continued)

FOREIGN PATENT DOCUMENTS

| CN | 104904141 A | 9/2015 |
| WO | 2014180495 A1 | 11/2014 |

OTHER PUBLICATIONS

Pittala, et al., "Training-Aided Frequency-Domain Channel Estimation and Equalization for Single-Carrier Coherent Optical Transmission Systems," Journal of Lightwave Technology, vol. 32, No. 24, Dec. 15, 2014, pp. 4849-4863.

(Continued)

*Primary Examiner* — Oommen Jacob
(74) *Attorney, Agent, or Firm* — Conley Rose, P.C.

(57) ABSTRACT

An optical transceiver in an optical communications network, comprising a receiver configured to receive an optical signal comprising an X-polarization component that comprises a first frame and a Y-polarization component that comprises a second frame. The optical transceiver also comprises a processor coupled to the receiver and configured to determine, in a time domain, a phase estimate according to the first frame and the second frame, determine, in a frequency domain, a channel estimate for the optical signal according to a relationship between the first frame, the second frame, and the phase estimate, and determine a compensated optical signal according to the channel esti- (Continued)

mate. The optical transceiver further comprises a transmitter coupled to the processor and configured to transmit the compensated optical signal to a downstream component in the optical communications network.

20 Claims, 6 Drawing Sheets

(56) References Cited

U.S. PATENT DOCUMENTS

| | | | | |
|---|---|---|---|---|
| 9,300,407 | B2* | 3/2016 | Zamani | H04B 10/616 |
| 2005/0196176 | A1* | 9/2005 | Sun | H04B 10/6162 |
| | | | | 398/152 |
| 2006/0013590 | A1* | 1/2006 | Hueda | H04B 10/60 |
| | | | | 398/149 |
| 2006/0159194 | A1* | 7/2006 | Magee | H04L 27/2657 |
| | | | | 375/267 |
| 2006/0285855 | A1* | 12/2006 | Sun | H03L 7/085 |
| | | | | 398/155 |
| 2007/0092260 | A1* | 4/2007 | Bontu | H04J 3/0608 |
| | | | | 398/152 |
| 2008/0152363 | A1* | 6/2008 | Koc | H04B 10/6971 |
| | | | | 398/208 |
| 2009/0148164 | A1 | 6/2009 | Roberts et al. | |
| 2009/0175629 | A1* | 7/2009 | Liu | H04B 10/25133 |
| | | | | 398/147 |
| 2010/0021163 | A1* | 1/2010 | Shieh | H04B 10/60 |
| | | | | 398/65 |
| 2010/0254702 | A1* | 10/2010 | Sun | H03L 7/0812 |
| | | | | 398/25 |
| 2010/0329677 | A1* | 12/2010 | Kaneda | H04B 10/60 |
| | | | | 398/65 |
| 2011/0194855 | A1* | 8/2011 | Batshon | H04B 10/60 |
| | | | | 398/65 |
| 2011/0274442 | A1* | 11/2011 | Zhang | H04B 10/0779 |
| | | | | 398/208 |
| 2011/0310951 | A1* | 12/2011 | Cvijetic | H04B 10/548 |
| | | | | 375/233 |
| 2012/0008952 | A1* | 1/2012 | Li | H04B 10/50 |
| | | | | 398/65 |
| 2012/0099637 | A1* | 4/2012 | Hu | H04L 25/0212 |
| | | | | 375/232 |
| 2012/0114341 | A1* | 5/2012 | Hu | H04B 10/25133 |
| | | | | 398/208 |
| 2012/0237206 | A1* | 9/2012 | Izumi | H04B 10/2572 |
| | | | | 398/25 |
| 2013/0163988 | A1* | 6/2013 | Krongold | H04B 10/6971 |
| | | | | 398/65 |
| 2013/0230313 | A1* | 9/2013 | Yan | H04L 25/0202 |
| | | | | 398/25 |
| 2014/0037291 | A1* | 2/2014 | Yan | H04L 5/04 |
| | | | | 398/65 |
| 2014/0044440 | A1* | 2/2014 | Endo | H04B 10/614 |
| | | | | 398/208 |
| 2015/0171972 | A1* | 6/2015 | Xie | H04B 10/616 |
| | | | | 398/205 |
| 2016/0197752 | A1* | 7/2016 | Schmalen | H04L 25/0228 |
| | | | | 375/298 |
| 2016/0308579 | A1* | 10/2016 | Abe | H04B 3/06 |
| 2016/0323040 | A1* | 11/2016 | Wood | H04B 10/612 |

OTHER PUBLICATIONS

Krishnan, et al., "Joint Acquisition of Chromatic Dispersion and Frequency Offset in Optical Systems," U.S. Appl. No. 14/951,195, filed Nov. 24, 2015, 32 pages.

Zhu, C., et al., "Frequency-Domain Blind Equalization for Long-Haul Coherent Pol-Mux 16-QAM System with CD Prediction and Dual-Mode Adaptive Algorithm," vol. 4, No. 5, Oct. 31, 2012, 10 pages.

Zhu, C., et al., "Two-Stage Frequency Domain Blind Equalization for Coherent Pol-Mux 16-QAM System with CD Prediction and Dual-Mode Adaptive Algorithm," WE2, Sep. 27, 2012, pp. 451-452.

Foreign Communication From A Counterpart Application, PCT Application No. PCT/CN2016/106813, International Search Report dated Feb. 24, 2017, 5 pages.

* cited by examiner

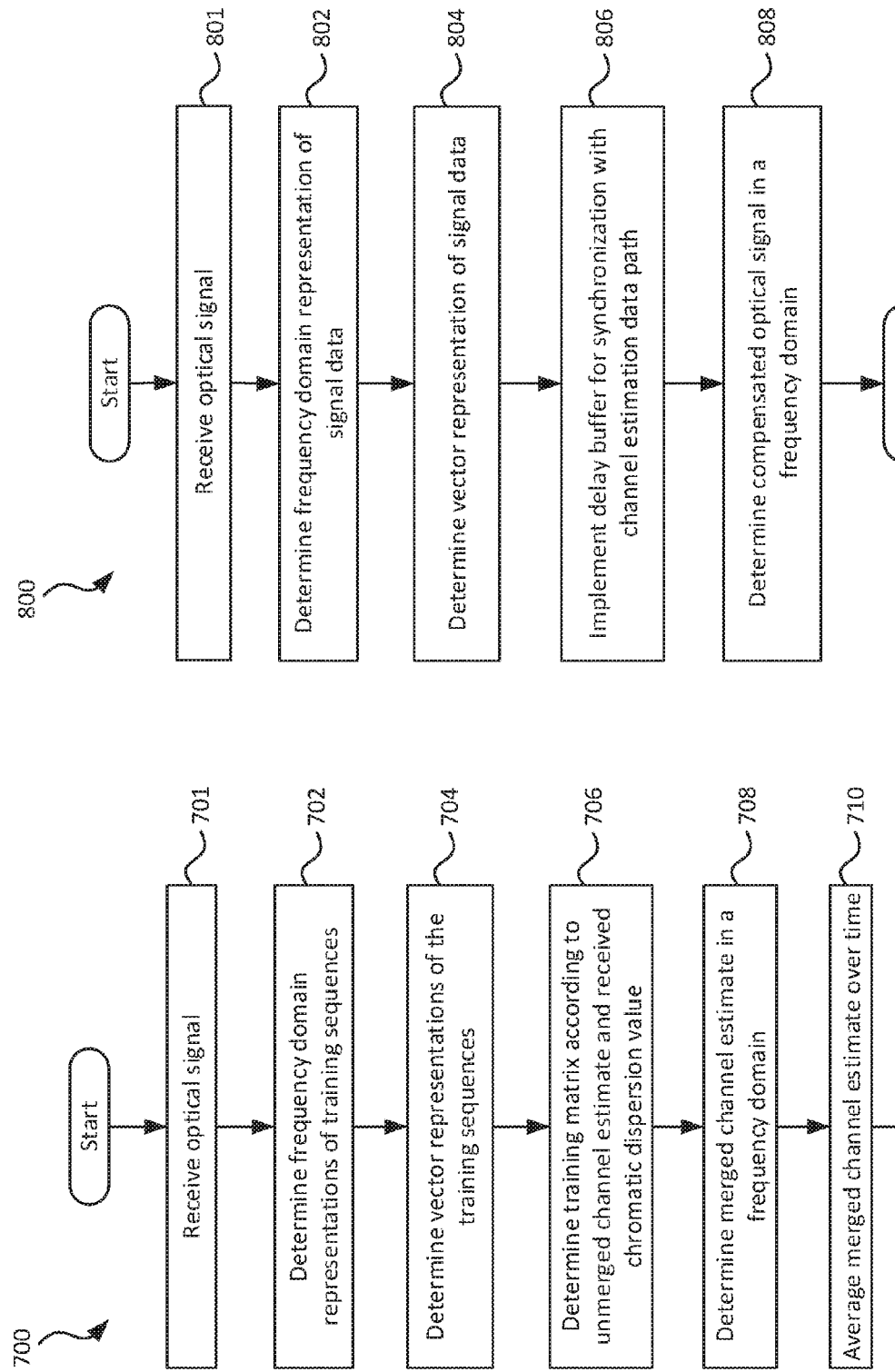

FREQUENCY DOMAIN OPTICAL CHANNEL ESTIMATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical communications systems facilitate high-speed and high-bandwidth data transmission over short and long distances (e.g., from a few hundred meters within a datacenter to thousands of meters of underwater fiber). One type of optical communication system for transmitting data over long distances is known as a long-haul optical communication system. In long-haul optical communication systems, data rates are increased by employing coherent optical transmissions, in which data may be modulated onto amplitudes, phases, and/or polarization components of an optical carrier signal. In these long-haul optical communication systems, the performance may be limited by fiber optic impairments such as chromatic dispersion (CD), local oscillator frequency offset (LOFO), polarization mode dispersion (PMD), phase noise, non-linear effects, and mixing of dual-polarization X and Y data streams due to time-varying state of polarization (SOP) rotations.

Often, these impairments are compensated for through digital signal processing in a mixed time and frequency domain approach (e.g., using a frequency domain to compensate for CD and using a time-domain equalizer to compensate for the mixed X and Y data streams). However, as a number of taps in the time-domain equalizer increases, the mixed time and frequency domain approach increases in complexity. Therefore, a single-domain approach to compensating for these impairments is desirable.

SUMMARY

In some embodiments, the disclosure includes an optical transceiver in an optical communications network, comprising a receiver configured to receive an optical signal comprising an X-polarization component that comprises a first frame and a Y-polarization component that comprises a second frame, a processor coupled to the receiver and configured to determine, in a time domain, a phase estimate according to the first frame and the second frame, determine, in a frequency domain, a channel estimate for the optical signal according to a relationship between the first frame, the second frame, and the phase estimate, and determine a compensated optical signal according to the channel estimate, and a transmitter coupled to the processor and configured to transmit the compensated optical signal to a downstream component in the optical communications network.

In some embodiments, the disclosure also includes an optical transceiver, wherein the processor is further configured to determine a first frequency domain representation of a first training sequence having a first size and a third training sequence having a third size of the first frame according to a fast Fourier transform (FFT) of a fifth size, determine a second frequency domain representation of a second training sequence having a second size and a fourth training sequence having a fourth size of the second frame according to the FFT of the fifth size, wherein the fifth size is larger than the first size, the second size, the third size, and the fourth size, determine a first vector representation of the first frequency domain representation, and determine a second vector representation of the second frequency domain representation.

In some embodiments, the processor is further configured to determine a training matrix according to the first training sequence, the second training sequence, the third training sequence, and the fourth training sequence, and determine a modified training matrix according to the training matrix, a first phase of the first training sequence, a second phase of the second training sequence, a third phase of the third training sequence, and a fourth phase of the fourth training sequence.

In some embodiments, the processor is further configured to determine a merged training matrix according to the modified training matrix and a CD estimate value. In some embodiments, the processor is further configured to further determine the channel estimate according to the merged training matrix, the first vector representation and the second vector representation. In some embodiments, the processor is further configured to time-average the channel estimate over a plurality of frames of the optical signal. In some embodiments, processor is further configured to delay compensating the optical signal according to an amount of time corresponding to a period of time-averaging of the channel estimate and implemented in a delay buffer of the processor. In some embodiments, processor is further configured to determine a third frequency domain representation of a first datum of the first frame and a second datum of the second frame, and determine a third vector representation of the third frequency domain representation. In some embodiments, processor is further configured to further determine the compensated optical signal according to the third vector representation.

In another embodiment, the disclosure includes a method implemented in an optical transceiver, comprising receiving, by a receiving module, an optical signal comprising at least one training sequence, processing, by a processor, the optical signal in a time domain to determine a frequency domain representation of the optical signal, and determining in a frequency domain, by the processor, a channel estimate for the optical signal according to the at least one training sequence, wherein the channel estimate compensates in the frequency domain for a PMD and CD in the optical signal.

In some embodiments, the disclosure also includes a method, wherein the optical signal is processed in the frequency domain to determine a vector matrix representation of the optical signal, wherein the optical signal is processed in the time domain to determine a phase characteristic, wherein a training matrix is determined according to the optical signal and the phase characteristic, and wherein the channel estimate is determined according to the training matrix and the vector matrix representation.

In some embodiments, the training matrix is merged with a predetermined CD estimate value before determining the channel estimate. In some embodiments, the channel estimate is determined by applying the training matrix to the training sequence of the optical signal. In some embodiments, the channel estimate is averaged over a period of time of the optical signal.

In yet another embodiment, the disclosure includes a method implemented in an optical transceiver, comprising receiving, by a receiving module, an optical signal comprising at least one datum and at least one optical signal impairment processing the optical signal in a time domain to determine a frequency domain representation of the at least one datum, and determining in a frequency domain, by a processor, a compensated optical signal according to the optical signal and a merged channel estimate.

In some embodiments the at least one datum is processed in the frequency domain to determine a vector matrix representation of the at least one datum. In some embodiments, the compensated optical signal is determined by applying the merged channel estimate to the vector matrix representation of the at least one datum. In some embodiments, determining the compensated optical signal is delayed for a predetermined period of time corresponding to an amount of time over which the channel estimate is merged. In some embodiments, the channel estimate comprises a CD estimate and a PMD estimate. In some embodiments, determining the compensated optical signal does not occur in the time domain.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is an embodiment of a method for channel estimation in an optical communications system.

FIG. 8 is an embodiment of a method for channel equalization in an optical communications system.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments that provide for compensation for impairments in an optical signal received by an optical receiver in an optical communications network. The impairments include, for example, chromatic dispersion (CD) and polarization mode dispersion (PMD). To compensate for the impairments, a channel estimate is determined for the optical signal. The channel estimate is determined in a frequency domain to reduce complexity and hardware requirements. The channel estimate may not be determined in a time-domain. Also to reduce complexity and hardware requirements, the channel estimate is determined according to at least one training sequence included in the optical signal.

Figure 1:
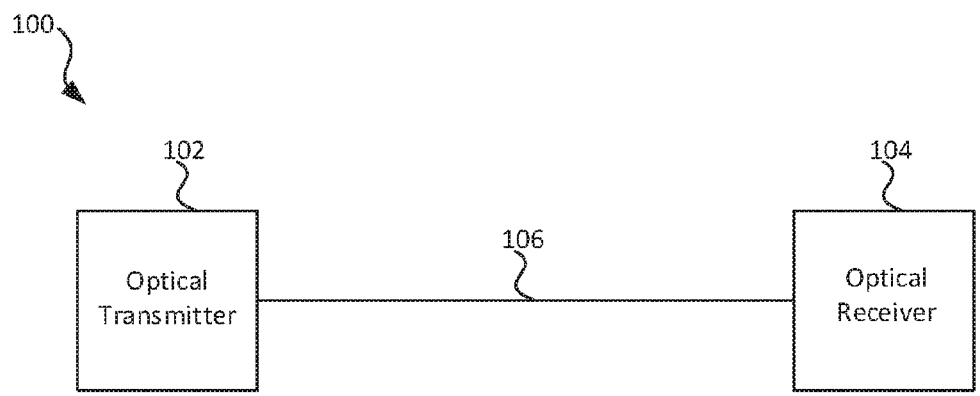
FIG. 1 is a schematic diagram of an embodiment of an optical communications network.

FIG. 1 is a schematic diagram of an embodiment of an optical communications network 100 (e.g., a coherent optical communications network) in which an embodiment of the present disclosure may operate. In one embodiment, the network 100 comprises a transmitter 102 communicatively coupled to a receiver 104 through an optical connection 106. Alternatively, the network 100 comprises a plurality of transmitters 102, a plurality of receivers 104, or both. The transmitter 102 is configured to transmit optical signals to the receiver 104 via the optical connection 106. Both the transmitter 102 and the receiver 104 may be implemented in a single transceiver such that the single transceiver facilitates bi-directional data communications.

The transmitter 102 comprises electrical-to-optical components (e.g., one or more laser diodes, one or more electrical drivers, one or more electrical-to-optical converters, or other suitable components for converting electrical data into optical data) for modulating electrical data signals onto an optical carrier (e.g., an optical carrier generated by a laser diode). For example, the transmitter 102 may modulate electrical data signals onto an optical carrier to form an optical signal that comprises two orthogonal linear-polarization components, an X-polarization component and a Y-polarization component.

The optical connection 106 comprises fiber optic cabling for carrying an optical signal from the transmitter 102 to the receiver 104. In some embodiments, the optical connection 106 may also comprises various components such as optical filters, optical amplifiers, or other devices located between the transmitter 102 and the receiver 104. The optical connection 106 may comprise one or more impairments such as, for example, CD, SOP rotations, polarization mode dispersion, polarization dependent loss, polarization dependent gain, non-linear phase noise, and optical white Gaussian noise. Additionally, imperfections in the transmitter 102 or the receiver 104, or a mismatch between the transmitter 102 and the receiver 104, may contribute to imperfections in the optical signal received at the receiver 104, such as LOFO and in-phase and quadrature phase (IQ) imbalance.

The receiver 104 comprises optical-to-electrical components (e.g., a photo diode, one or more analog to digital convertors, a digital signal processing unit, or other suitable components for converting optical data into electrical data) for converting a received optical signal into electrical data signals. For example, the receiver 104 may be configured to receive an optical signal comprising an X-polarization component and a Y-polarization component and split the X-polarization component from the Y-polarization component before converting the optical signal into an electrical signal for processing according to the present disclosure.

Figure 2:
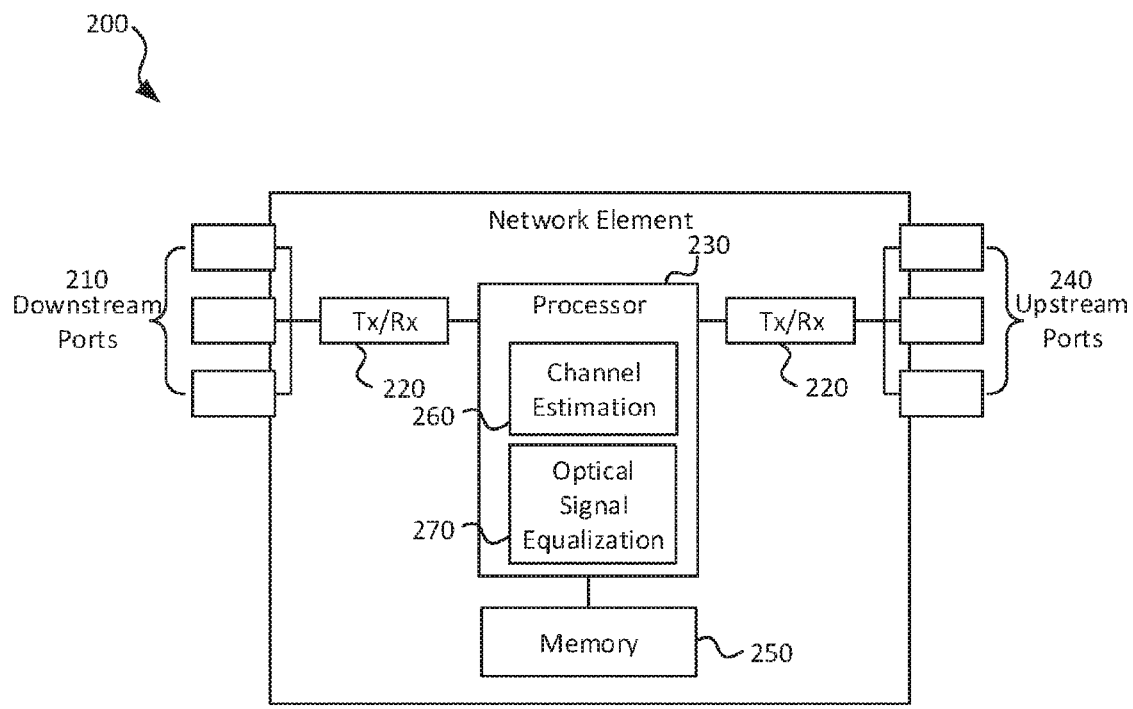
FIG. 2 is a schematic diagram of an embodiment of a network element for operating in an optical communications network.

FIG. 2 is a schematic diagram of an embodiment of a network element for operating in an optical communications network. The network device 200 is suitable for implementing the disclosed embodiments, including the units 400, 500, and 600 and the methods 700, 800 as discussed below. The network device 200 comprises downstream ports 210; transceiver units (Tx/Rx) 220 for transmitting or receiving data; a processor, logic unit, or central processing unit (CPU) 230 to process the data; upstream ports 240 for transmitting or receiving the data; and a memory 250 for storing the data. The network device 200 may also comprise optical-to-electrical (OE) components and electrical-to-optical (EO) components coupled to the downstream ports 210, transceiver units 220, and upstream ports 240 for egress or ingress of optical or electrical signals. For example, the OE or EO components may comprise laser diodes or optical detectors.

The processor 230 may be implemented by hardware and software. The processor 230 may be implemented as one or more CPU chips, cores (e.g., as a multi-core processor), field-programmable gate arrays (FPGAs), application specific integrated circuits (ASICs), and digital signal processors (DSPs). The processor 230 is in communication with the downstream ports 210, transceiver units 220, upstream ports 240, and memory 250. The processor 230 comprises a channel estimation module 260. The channel estimation module 260 performs at least part of the methods 700 and 800. The inclusion of the channel estimation module 260 therefore provides an improvement to the functionality of the network device 200. The channel estimation module 260 also effects a transformation of the network device 200 to a different state. Alternatively, the channel estimation module 260 is implemented as instructions stored in the memory 250 and executed by the processor 230. The processor 230 also comprises an optical signal equalization module 270. The optical signal equalization module 270 performs at least part of the methods 700 and 800 and performs equalization and compensation of an optical signal. The inclusion of the optical signal equalization module 270 therefore provides an improvement to the functionality of the network device 200. The optical signal equalization module 270 also effects a transformation of the network device 200 to a different state. Alternatively, the optical signal equalization module 270 is implemented as instructions stored in the memory 250 and executed by the processor 230.

The memory 250 comprises one or more disks, tape drives, and solid-state drives and may be used as an overflow data storage device, to store programs when such programs are selected for execution, and to store instructions and data that are read during program execution. The memory 250 may be volatile and non-volatile and may be read-only memory (ROM), random-access memory (RAM), ternary content-addressable memory (TCAM), and static random-access memory (SRAM).

Figure 3:
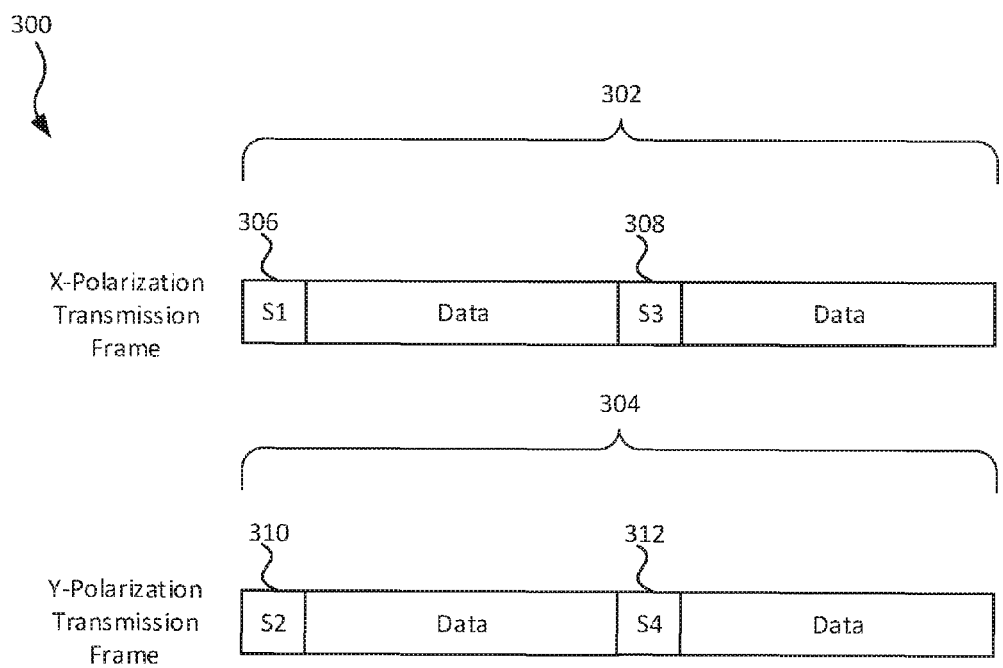
FIG. 3 is a schematic diagram of an embodiment of an optical transmission frame structure.

FIG. 3 is a schematic diagram of an embodiment of an optical transmission frame structure 300. The frame structure 300 comprises a plurality of transmission frames, each corresponding to a data stream of an optical signal. For example, for an optical signal that comprises dual X and Y polarization components, the frame structure 300 comprises an X-polarization transmission frame 302 and a Y-polarization transmission frame 304. A length of the frames 302 and 304 is determined according to specific implementation methods of an optical communications network, but may be, for example, 1024 symbols. The frames 302 and 304 are carried in an optical signal from a transmitter to a receiver via an optical connection in an optical communications network, for example, from the transmitter 102 to the receiver 104 via the connection 106 in the network 100. The frames 302 and 304 enable the receiver to determine a channel estimation for the optical connection and thus, phase noise. To enable the receiver to determine the channel estimation, the frame 302 comprises a plurality of training sequences 306 and 308, and the frame 304 comprises a plurality of training sequences 310 and 312. Each of the training sequences 306, 308, 310, and 312 comprise a plurality of symbols. Each frame 302 and 304 further comprises at least one block of transmitted data. Alternatively, the frame 302 and the frame 304 each comprise a plurality of frames that comprise one training sequence and one block of transmitter data each. For example, in FIG. 3 when the frames 302 and 304 each comprises a plurality of frames, frame 302 comprises a first frame that includes training sequence 306 and a block of data, and a second frame that includes training sequence 308 and a second block of data. Frame 304 then comprises a third frame that includes training sequence 310 and a third block of data, and training sequence 312 and a fourth block of data.

As shown in FIG. 3, the plurality of training sequences for the frame 302 (e.g., training sequences 306 and 308) and the frame 304 (e.g., training sequence 310 and 312) occur sequentially in time; however, the training sequences do not occur consecutively (e.g., one immediately following the other with no intervening data). Distributing the training sequences 306, 308, 310, and 312 in the frame structure 300 so that they occur sequentially, but not consecutively, reduces an amount of overhead in the frames 302 and 304, and enables mitigation of effects of cycle-slip in the optical signal. For example, in the frame 302, the training sequences 306 and 308 are distributed sequentially such that training sequence 308 comes after training sequence 306, but the training sequences 306 and 308 are not consecutive because of the intervening block of data located between the training sequence 306 and the training sequence 308. Cycle-slip occurs when amplified spontaneous emission (ASE) noise or phase noise causes a misdetection of a received signal, thereby leading to an at least 360/M degree difference in a detected phase of the of a constellation point of the received signal, where M is an order of the constellation. Flexibility is gained in mitigating cycle-slip by distributing the training sequences 306-312 through the frames 302 and 304, thereby enabling an optical receiver to detect a change in phase between a first of the training sequences 306-312 and a second of the training sequences 306-312.

Each of the training sequences 306-312 comprises a sequence of symbols. The particular sequence of symbols chosen for the training sequences 306-312 may be determined according to properties of the particular sequence, for example, such that the sequence of symbols has low cross-correlation and orthogonality properties. In one embodiment, each of the training sequences 306-312 comprises a Golay sequence. In another embodiment, each of the training sequences 306-312 comprises a Cazac sequence. In either embodiment, each of the training sequences 306-312 has a length of 16 symbols. As with the particular type of sequence used for the training sequence 306-312, the length of the training sequences 306-312 may be determined by specific implementation methods that tailor the training sequences to provide for a specific desired performance in an optical communications network.

In addition to being determined according to low cross-correlation and orthogonality properties, the training sequences 308 and 312 may be determined according to a relationship to training sequences 306 and 310, such that, for example, the training sequence 308 is determined according to a relationship to training sequence 310 and training sequence 312 is determined according to a relationship to training sequence 306. For example, the training sequences 306-312 are related in the frequency domain such that after performing a fast Fourier transform (FFT) to the training sequences 306-312 received in the time domain, the training sequences 306-312 are related according to:

$$F_4(k) = F_1^*(k) \qquad (1)$$

$$F_3(k) = -F_2^*(k), \qquad (2)$$

in which $F_1(k)$ is a frequency domain representation of the training sequence 306 for all points k in the frequency domain, $F_2(k)$ is a frequency domain representation of the training sequence 308, $F_3(k)$ is a frequency domain representation of the training sequence 310, $F_4(k)$ is a frequency domain representation of the training sequence 312, and an asterisk (*) denotes a conjugate. The relationships among the training sequences 306-312 may be calculated by the optical transmitter or the optical receiver at the time that the training sequences are transmitted or received, respectively, in the optical communications network. Alternatively, the relationship among the training sequences 306-312 may be determined according to a lookup table that is stored in the optical transmitter and the optical receiver and comprises pre-calculated relationships among the training sequences 306-312.

Figure 4:
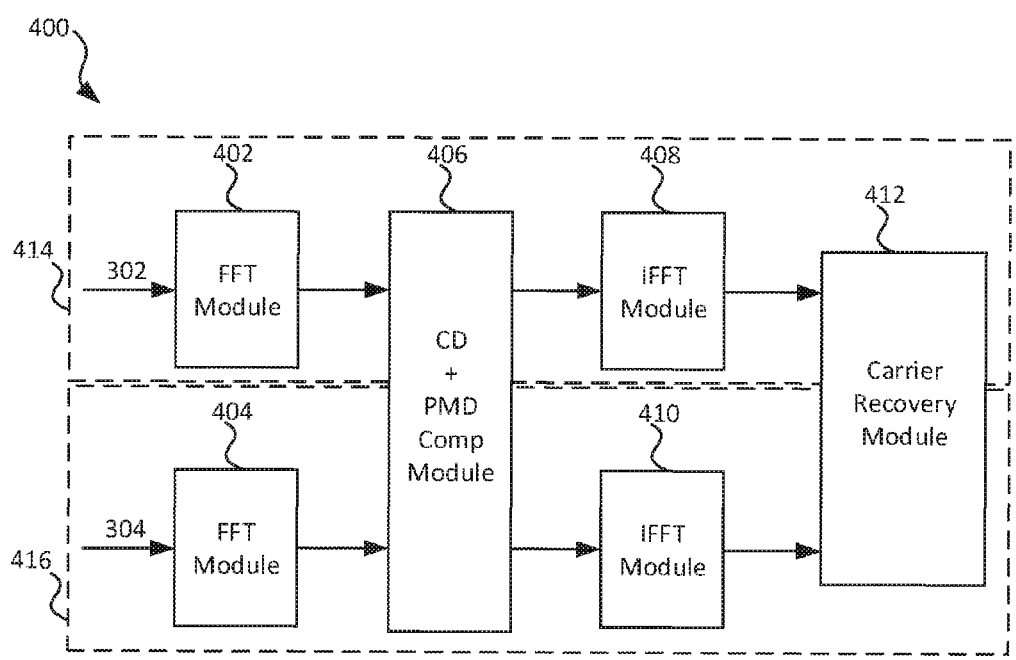
FIG. 4 is a schematic diagram of an optical communications network receiving unit.

FIG. 4 is a schematic diagram of an optical communications network receiving unit 400. The unit 400 is implemented as a module in a network element, for example, as a module in the processor 230 of the network element 200. Alternatively, the unit 400 is implemented as a stand-alone unit. The unit 400 comprises a plurality of data paths 414 and 416, for example, a data path 414 for an X-polarization component of an optical signal and a data path 416 for a Y-polarization component of the optical signal that are processed to obtain data transmitted from an optical transmitter in the optical communications network. To process the optical signal, the unit 400 comprises a plurality of FFT modules 402 and 404 such that each of the modules 402 and 404 is associated with a single data path 414 or 416, a CD and PMD compensation module 406 that is coupled to and shared among the plurality of data paths 414 and 416, a plurality of inverse FFT (IFFT) modules 408 and 410 coupled to the CD and PMD compensation module 406 such that each of the modules 408 and 410 is associated with a single data path 414 or 416, and a carrier recovery module 412 that is coupled to the modules 408 and 410 and shared among the plurality of data paths 414 and 416.

The FFT modules 402 and 404 are configured to receive the optical signal in a time domain and convert the optical signal to a frequency domain. For example, the FFT module 402 applies an FFT to the training sequences of the X-polarization component of the optical signal, for example, the training sequences 306 and 308 of the frame 302, and a the FFT module 404 applies an FFT to the training sequences of the Y-polarization component of the optical signal, for example, the training sequences 310 and 312 of the frame 304.

A size, or number of samples, of the FFT modules 402 and 404 is determined according to a size of the training sequences implemented in the optical communication network. For example, in an optical communications network in which 16 symbol training sequences are implemented, the FFT modules 402 and 404 have a corresponding size of 16. Alternatively, the FFT modules 402 and 404 have a size that is larger than the size of the training sequences. For example, in an optical communications network in which 16 symbol training sequences are implemented, the FFT modules 402 and 404 have a size of 64. Similarly, the FFT modules 402 and 404 may have a size of 32, 128, 256, or any other suitable size. For example, for a first frame that includes a first training sequence of a first size and a third training sequence of a third size, a frequency domain representation of the first training sequence and the third training sequence is determined according to an FFT of a fifth size. For a second frame that includes a second training sequence of a second size and a fourth training sequence of a fourth size, a frequency domain representation of the second training sequence and the fourth training sequence is determined according to the FFT of the fifth size. The fifth size of the FFT is equal to or larger than the first size, the second size, the third size, and the fourth size such that the FFT modules 402 and 404 that determine the frequency domain representation of each of the first training sequence, the second training sequence, the third training sequence, and the fourth training sequence are equal to or larger than the size of the first training sequence, the second training sequence, the third training sequence, and the fourth training sequence. Each of the training sequences has the same size such that the first size, the second size, the third size, and the fourth size are equal. Alternatively, the first size, the second size, the third size, and the fourth size are different.

The CD and PMD compensation module 406 is configured to receive the optical signal in the frequency domain from the FFT modules 402 and 404 and determine a PMD estimation for compensation. Prior to determining the PMD estimation for compensation, the CD and PMD compensation module 406 applies a predetermined CD compensation value to the training sequences to compensate for CD impairments in the optical signal. The CD compensation value may be determined and received from an upstream device in the optical communications network, or the CD compensation value may be received from an earlier process (not shown) implemented in the unit 400 that may share hardware components with the various modules of the unit 400. The CD compensation value may be determined by any suitable means, for example, according to a method for jointly determining CD and LOFO compensation as described in U.S. patent application Ser. No. 14/951,195, filed on Nov. 24, 2015 by Murali Krishnan et al., and entitled "Joint Acquisition of Chromatic Dispersion and Initial Frequency Offset in Coherent Optical Systems," which is incorporated herein by reference as if reproduced in its entirety.

After applying the CD compensation value to the training sequences, the CD and PMD compensation module 406 determines an estimate for PMD compensation as will be described in further detail below. The CD and PMD compensation module 406 then merges the CD compensation value and the PMD compensation value to determine a single compensation value to apply to the data of the optical signal to compensate for the CD and the PMD, also as described below. Once the merged CD and PMD compensation value is determined, the CD and PMD compensation module 406 applies the merged compensation value to the optical signal to compensate for the CD and the PMD impairments in the optical signal.

The IFFT modules 408 and 410 are configured to receive the optical signal from the CD and PMD compensation module 406 in the frequency domain and convert the optical signal into the time domain. Subsequently, the carrier recovery module 412 is configured to determine an estimate of and compensate for a difference in frequency or phase between a carrier wave of the optical signal and a local oscillator (not shown) of the unit 400. In the unit 400, each module depends on input received from a preceding module or from outside of the unit 400. As such, the modules of the unit 400 may be referred to as un-coupled. For example, the CD and PMD compensation module 406 is un-coupled, or decoupled, from the carrier recovery module 412 such that processing and output of the CD and PMD compensation module 406 does not depend on processing or output of the carrier recovery module 412.

Figure 5:
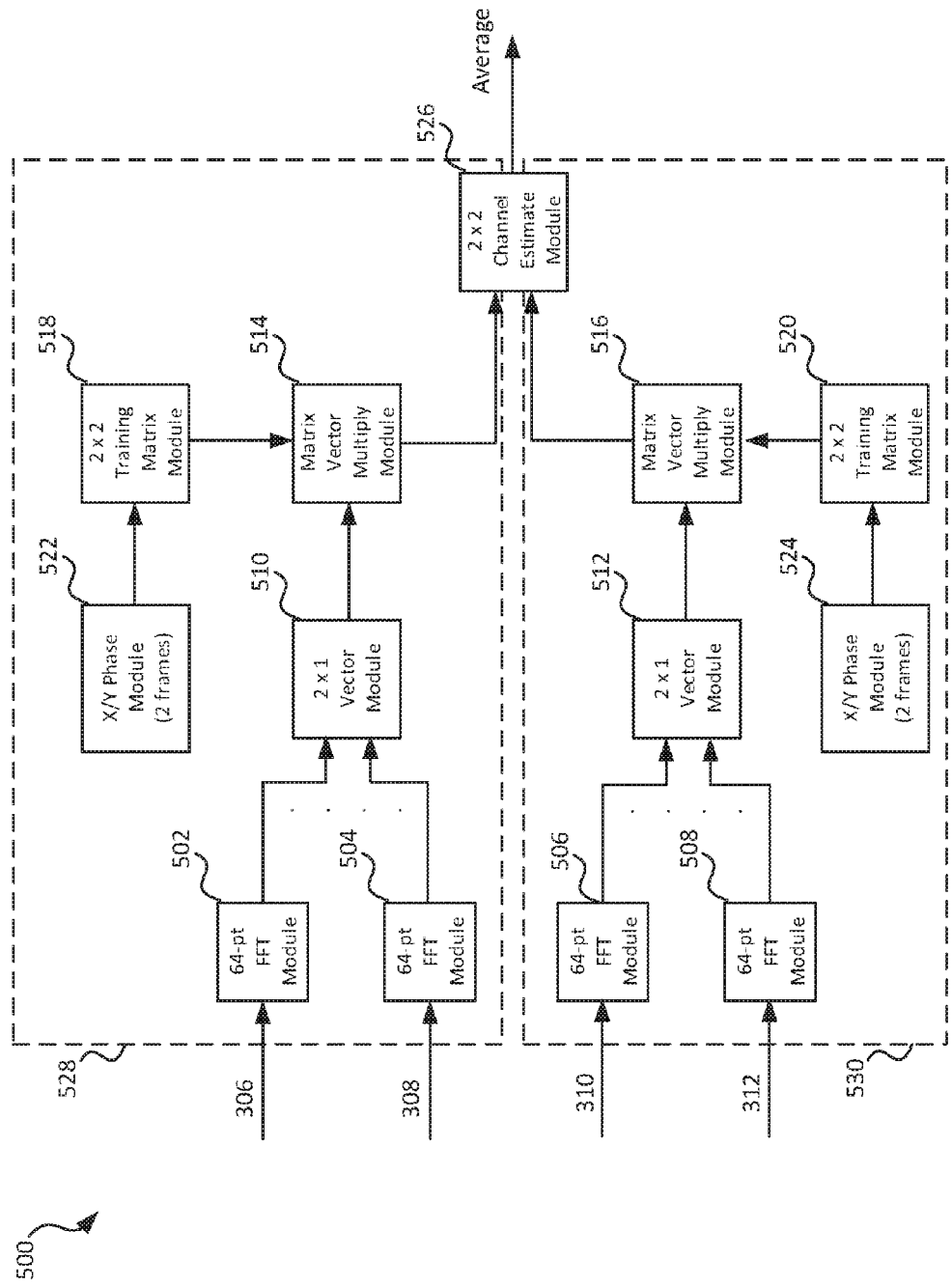
FIG. 5 is a schematic diagram of an embodiment of a channel estimation unit.

FIG. 5 is a schematic diagram of an embodiment of a channel estimation unit 500. The unit 500 is implemented as a part of a module, for example, the CD and PMD compensation module 406, in a receiver in an optical communication system, for example, the receiver 104 of the network 100. Alternatively, the unit 500 is implemented as a stand-alone unit. The unit 500 comprises a plurality of data paths 528 and 530, for example, a data path 528 for the training sequences of an X-polarization component of an optical signal and a data path 530 for the training sequences of a Y-polarization component of the optical signal, that are processed to obtain data transmitted from an optical transmitter in the optical communications network. To process the optical signal, the unit 500 comprises a plurality of FFT modules 502, 504, 506, and 508. As discussed above, each of the FFT modules 502-508 may be any suitable size, for example, 64 points. Each of the FFT modules 502-508 is associated with a single signal, such as a single training sequence, in the unit 500 and determines a frequency domain representation for the respective received time domain equivalent signal. For example, the FFT modules 502 and 504 are associated with the X-polarization component of the optical signal and the FFT modules 506 and 508 are associated with the Y-polarization component of the optical signal. The FFT module 502 corresponds to a training sequence of a first frame of the X-polarization component, the FFT module 504 corresponds to a training sequence of a second frame of the X-polarization component, the FFT module 506 corresponds to a training sequence of a first frame of the Y-polarization component, and the FFT module 508 corresponds to a training sequence of a second frame of the Y-polarization component. Alternatively, the unit 500 comprises fewer FFT modules 502-508 than data paths such that one or more FFT modules 502-508 are reused one or more times, for example, one FFT module for processing training sequences from both frames of the X-polarization component and one FFT module for processing training sequences from both frames of the Y-polarization component.

2×1 vector modules 510 and 512 receive the optical signal in the frequency domain from the modules 502-508 and determine a vector representation for the optical signal. For example, after the FFT module 502 and the FFT module 504 convert the training sequences of the first and second frame, respectively, of the X-polarization component of the optical signal into the frequency domain, the X-polarization component frequency domain signals are received by the 2×1 vector module 510. Similarly, after the FFT module 506 and the FFT module 508 convert the training sequences of the first and second frame, respectively, of the Y-polarization component of the optical signal into the frequency domain, the Y-polarization component frequency domain signals are received by the 2×1 vector module 512.

The 2×1 vector module 510 converts the received X-polarization component frequency domain signals into a vector representation, for example, a 2×1 vector having two rows in one column, where a first row represents the first of the X-polarization component frequency domain signals, for example, from the FFT module 502, and the second row represents the second of the X-polarization component frequency domain outputs, for example, from the FFT module 504. The 2×1 vector module 512 converts the received Y-polarization component frequency domain signals into a vector representation, for example, a 2×1 vector having two rows in one column, where a first row represents the first of the Y-polarization component frequency domain signals, for example, from the FFT module 506, and the second row represents the second of the Y-polarization component frequency domain outputs, for example, from the FFT module 508. After processing by the 2×1 vector modules 510 and 512, the optical signal is represented by a pair of 2×1 vectors, for example, a 2×1 vector representing the X-polarization component and a 2×1 vector representing the Y-polarization component. Also after processing by the 2×1 vector modules 510 and 512, the 2×1 vectors are each transmitted to matrix vector multiple modules 514 and 516.

The matrix vector multiply modules 514 and 516 receive the 2×1 vectors from the 2×1 modules 510 and 512 and perform a multiplication of the received 2×1 vectors with a 2×2 training matrix received from 2×2 training matrix modules 518 and 520. The 2×2 training matrix is determined according to frequency domain representations of the training sequences of the optical signal, an estimated phase of the training sequences that is determined by and received from the X/Y phase modules 522 and 524, and the CD compensation value that is received by the unit 500. Based on the multiplication, the matrix vector multiply modules 514 and 516 each output a 2×1 matrix that is combined to form a final 2×2 channel estimate.

The 2×2 channel estimate module 526 receives the 2×1 matrices output from the matrix vector multiply modules 514 and 516 and combines the matrices to form the 2×2 channel estimate according to the training sequences of the optical signal. The 2×2 channel estimate is then forwarded for use in compensating the optical signal for the CD and PMD. For example, the 2×2 channel estimate module 526 transmits the 2×2 channel estimate to another module, or unit, in the receiver to perform compensation. The compensation is performed, for example, by a channel equalization unit such as channel equalization unit 600, described below. Alternatively, prior to transmitting the 2×2 channel estimation, 2×2 channel estimate module 526 averaged the 2×2 channel estimation over a given period, for example over a period of time or a number of frequency points. Averaging the 2×2 channel estimate provides for improved performance in the presence of noise in the optical signal.

Figure 6:
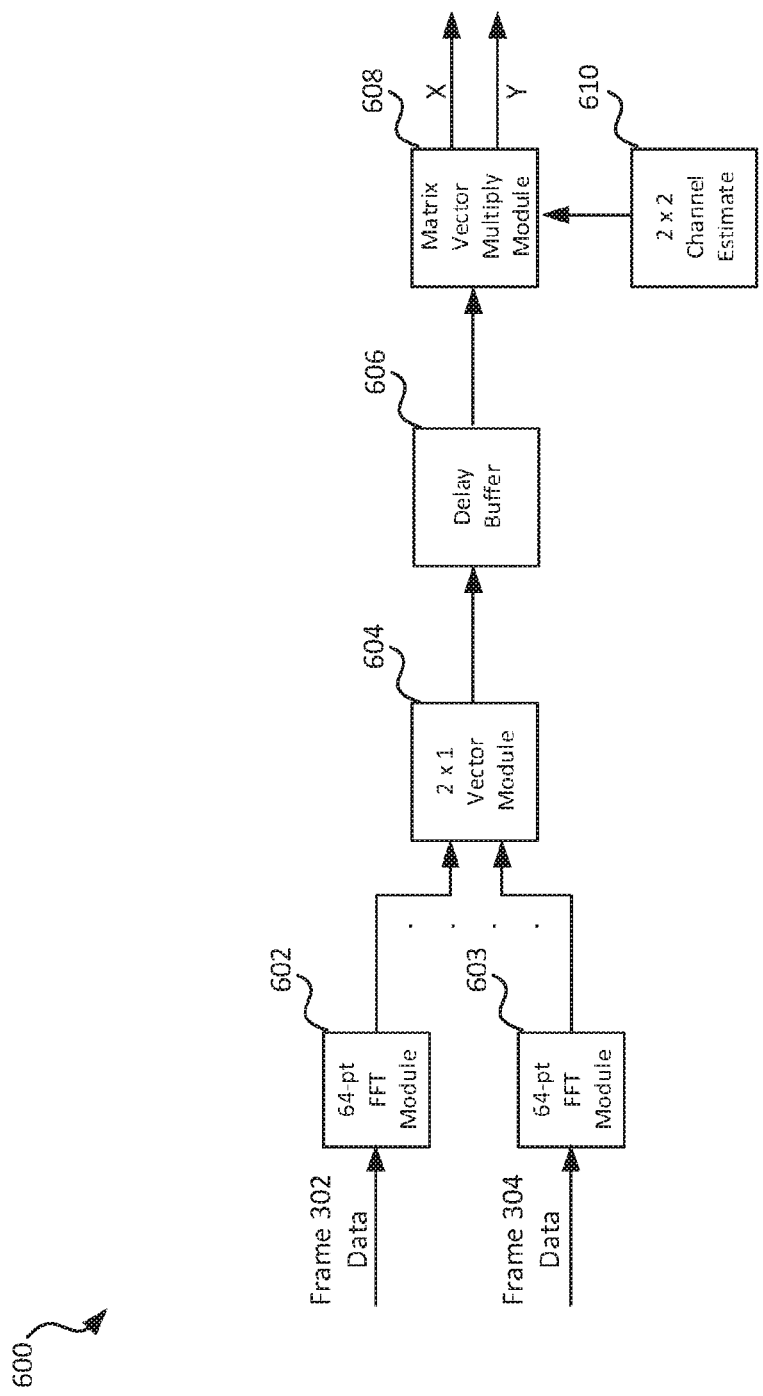
FIG. 6 is a schematic diagram of an embodiment of a channel equalization unit.

FIG. 6 is a schematic diagram of an embodiment of a channel equalization unit 600. The unit 600 is implemented as a part of a module, for example, the CD and PMD compensation module 406, in a receiver in an optical communication system, for example, the receiver 104 of the network 100. Alternatively, the unit 600 is implemented as a stand-alone unit. The unit 600 receives data from an X-polarization component of an optical signal, data from a Y-polarization component of the optical signal, and a channel estimate for the optical signal, for example the 2×2 channel estimate from the module 512, to provide compensation and equalization for impairments in the optical signal.

To process the optical signal before applying the channel estimate, the unit 600 comprises a plurality of FFT modules 602 and 603. The FFT modules 602 and 603 receive the optical signal in the time domain and determine a frequency domain representation for the optical signal according to an FFT. For example, the FFT module 602 receives the data from the X-polarization component of the optical signal and the FFT module 603 receives the data from the Y-polarization component of the optical signal. As discussed previously, the FFT modules 602 and 603 may be any suitable size, for example, 64 points. The 2×1 vector module 604 receives the optical signal in the frequency domain from the FFT modules 602 and 603 and determines a vector representation for the optical signal. For example, after the FFT module 602 and the FFT module 603 convert the data of the X-polarization component of the optical signal and the data of the Y-polarization component of the optical signal into the frequency domain, the module 604 receives the frequency domain signals. The 2×1 vector module 604 converts the received frequency domain signals into a vector representation, for example, a 2×1 vector having two rows in one column, where a first row represents the data of the X-polarization component frequency domain signals, for example, from the FFT module 602, and the second row represents the data of the Y-polarization component frequency domain outputs, for example, from the FFT module 603. After the 2×1 vector module 604 processes the optical signal, the 2×1 vector module 604 transmits the resulting 2×1 vectors to a delay buffer 506.

The delay buffer 606 delays equalization of the optical signal. Equalization of the optical signal is delayed to improve performance of the unit 600 and to improve an overall performance of a module in which the unit 600 is implemented, such as the CD and PMD compensation module 406. For example, performance is improved by delaying equalization to provide additional time for the channel estimate to be determined, for example, by averaging the channel estimate over a given period of time, and received by the unit 600. An amount of time for delaying the optical signal in the buffer 606 is determined according to particular implementation methods of the unit 600 and depends, for example, on the period over which the channel estimate is averaged prior to being received by the unit 600.

After expiration of the period for delaying the optical signal, the matrix vector multiply module 608 receives the optical signal from the buffer 606. Additionally, the module 608 receives the channel estimate for performing equalization or compensation on the optical signal from another unit, for example the unit 500, as discussed above, as a 2×2 channel estimate 610. After receiving the optical signal and the channel estimate, the module 608 performs a matrix vector multiplication of the optical signal and the 2×2 channel estimate 610 to produce an equalized or compensated optical signal according to $$\begin{bmatrix} \hat{X}_{in}(k) \\ \hat{Y}_{in}(k) \end{bmatrix} = \begin{bmatrix} T_{11}(k) & T_{12}(k) \\ T_{21}(k) & T_{22}(k) \end{bmatrix}^{-1} \begin{bmatrix} X_{out}(k) \\ Y_{out}(k) \end{bmatrix} \quad (2)$$

in which the matrix of $T_{11}(k)$, $T_{12}(k)$, $T_{21}(k)$, and $T_{22}(k)$ is the 2×2 channel estimate 610 received by the module 608 with frequency domain values, the matrix of $X_{out}(k)$ and $Y_{out}(k)$ is the 2×1 vector matrix of frequency domain values received from the buffer 606 and generated by the module 604, and the matrix of $\hat{X}_{in}(k)$ and $\hat{Y}_{in}(k)$ is a 2×1 vector of the equalized signal that is output by the unit 600 in the frequency domain.

FIG. 7 is an embodiment of a method 700 for channel estimation in an optical communications system. The method 700 is implemented in a device in an optical communication network for determining compensation for impairments in an optical signal according to a plurality of training sequences included in the optical signal. For example, the method 700 may be implemented in an optical receiver such as the receiver 104 in the network 100. At step 701, a receiving module, for example a receiving module of an optical receiver, receives an optical signal comprising at least one training sequence, or training sequences. At step 702, frequency domain representations of the training sequences are determined according to $$fa_{11} = \text{FFT}(S1) \quad (3)$$

$$fb_{11} = \text{FFT}(S2) \quad (4)$$

$$fa_{22} = \text{FFT}(S3) \quad (5)$$

$$fb_{22} = \text{FFT}(S4) \quad (6)$$

in which $fa_{11}$ is the frequency domain representation of the first training sequence S1 from a first frame of an X-polarization component of the optical signal in the time domain, $fb_{11}$ is the frequency domain representation of the second training sequence S2 from a first frame of a Y-polarization component of the optical signal in the time domain, $fa_{22}$ is the frequency domain representation of the third training sequence S3 from a second frame of the X-polarization component of the optical signal in the time domain, $fb_{22}$ is the frequency domain representation of the fourth training sequence S4 from a second frame of the Y-polarization component of the optical signal in the time domain, and FFT is a fast Fourier transform operation. The frequency domain representations are determined, for example, by FFT modules such as the FFT modules 502-508 of the unit 500.

At step 704, vector representations of the frequency domain representations of the training sequences are determined. For example, a first 2×1 vector representation is formed from the frequency domain representation of the training sequences from the X-polarization component of the optical signal, and a second 2×1 vector representation is formed from the frequency domain representation of the training sequences from the Y-polarization component of the optical signal. The 2×1 vectors are determined, for example, by the 2×1 vector modules 510-512 of the unit 500.

At step 706, a training matrix is determined according to an unmerged channel estimate and a received CD value. First, a channel estimate for compensating the optical signal for the impairments is determined. For example, a channel estimate for the X-polarization component of the optical signal is determined such that:

$$\begin{bmatrix} T_{11}(k) \\ T_{12}(k) \end{bmatrix} = \begin{bmatrix} fa_{11}(k) & fb_{11}(k) \\ fa_{22}(k) & fb_{22}(k) \end{bmatrix}^{-1} \begin{bmatrix} X_{in1}(k) \\ X_{in2}(k) \end{bmatrix} \quad (7)$$

in which $fa_{11}$, $fb_{11}$, $fa_{22}$, and $fb_{22}$ are as determined in step 702, $X_{in1}(k)$ is the first training sequence of the X-polarization component of the optical signal, and $X_{in2}(k)$ is the second training sequence of the X-polarization component of the optical signal. Similarly, a channel estimate for the Y-polarization component of the optical signal is determined such that:

$$\begin{bmatrix} T_{21}(k) \\ T_{22}(k) \end{bmatrix} = \begin{bmatrix} fa_{11}(k) & fb_{11}(k) \\ fa_{22}(k) & fb_{22}(k) \end{bmatrix}^{-1} \begin{bmatrix} Y_{in1}(k) \\ Y_{in2}(k) \end{bmatrix} \quad (8)$$

in which $fa_{11}$, $fb_{11}$, $fa_{22}$, and $fb_{22}$ are as determined in step 702, $Y_{in1}(k)$ is the first training sequence of the Y-polarization component of the optical signal, and $Y_{in2}(k)$ is the second training sequence of the Y-polarization component of the optical signal. As discussed previously, one impairment from which an optical signal may suffer is phase noise. In the presence of phase noise in the optical signals being processed according to the method 700, the above training matrices according to equations (7) and (8) are modified to create modified training matrices that account for the phase noise according to:

$$\begin{bmatrix} T_{11}(k) \\ T_{12}(k) \end{bmatrix} = \begin{bmatrix} fa_{11}(k)e^{j\phi_1} & fb_{11}(k)e^{j\phi_2} \\ fa_{22}(k)e^{j\phi_3} & fb_{22}(k)e^{j\phi_4} \end{bmatrix}^{-1} \begin{bmatrix} X_{in1}(k) \\ X_{in2}(k) \end{bmatrix} \quad (9)$$

$$\begin{bmatrix} T_{21}(k) \\ T_{22}(k) \end{bmatrix} = \begin{bmatrix} fa_{11}(k)e^{j\phi_1} & fb_{11}(k)e^{j\phi_2} \\ fa_{22}(k)e^{j\phi_3} & fb_{22}(k)e^{j\phi_4} \end{bmatrix}^{-1} \begin{bmatrix} Y_{in1}(k) \\ Y_{in2}(k) \end{bmatrix} \quad (10)$$

in which $e^{j\phi}$ is a complex component that describes a phase characteristic of the training sequences of the optical signal and is determined for each of the training sequences of the optical signal according to:

$$\phi_1 = \text{angle}\left\{\sum_{n=0}^{N-1} X_{in1}(n)S_1^*(n)\right\} \quad (11)$$

$$\phi_2 = \text{angle}\left\{\sum_{n=0}^{N-1} Y_{in1}(n)S_2^*(n)\right\} \quad (12)$$

$$\phi_3 = \text{angle}\left\{\sum_{n=0}^{N-1} X_{in2}(n)S_3^*(n)\right\} \quad (13)$$

$$\phi_4 = \text{angle}\left\{\sum_{n=0}^{N-1} Y_{in2}(n)S_4^*(n)\right\} \quad (14)$$

in which $X_{in1}(n)$, $X_{in2}(n)$, $Y_{in1}(n)$, and $Y_{in2}(n)$ are time domain representations of the training sequences of the X-polarization component and the Y-polarization component, respectively, and $S_1^*(n)$, $S_2^*(n)$, $S_3^*(n)$, and $S_4^*(n)$ are complex conjugates of the training sequences in the time domain. By modifying the training matrices of equations (7) and (8) to form the modified training matrices of equations (9) and (10), the modified training matrices become independent of an effect of phase noise. Causing the modified training matrices to be independent of phase noise enables time-averaging across multiple frames of the optical signal.

The modified training matrices according to equations (9) and (10) may be further modified to create merged training matrices that provide additional compensation to the optical signal. For example, the modified training matrices are merged with a predetermined CD compensation value such that the merged training matrices facilitate compensation for both CD and PMD. To form the merged training matrices for compensation of both CD and PMD, new representations of the training sequences in the frequency domain are determined by multiplying a phase term corresponding to the predetermined CD compensation value by the original frequency domain representation of each training sequence according to equations (3)-(6) according to:

$$\begin{bmatrix} fc_{11}(k) & fd_{11}(k) \\ fc_{22}(k) & fd_{22}(k) \end{bmatrix} = \begin{bmatrix} fa_{11}e^{-j\phi_c(k)} & fb_{11}e^{-j\phi_c(k)} \\ fa_{22}e^{-j\phi_c(k)} & fb_{22}e^{-j\phi_c(k)} \end{bmatrix} \quad (15)$$

in which $\phi_c(k)$ is the phase term corresponding to the predetermined CD compensation value, $fc_{11}(k)=fa_{11}e^{-j\phi_c(k)}$, $fd_{11}(k)=fb_{11}e^{-j\phi_c(k)}$, $fc_{22}(k)=fa_{22}e^{-j\phi_c(k)}$, and $fd_{22}(k)=fb_{22}e^{-j\phi_c(k)}$. Finally, the modified training matrices of equations (9) and (10) are modified using the variable substitution of equation (15) to form merged, or final, training matrices for channel estimation that provide for both CD and PMD compensation according to:

$$\begin{bmatrix} T_{11}(k) \\ T_{12}(k) \end{bmatrix} = \begin{bmatrix} fc_{11}(k)e^{j\phi_1} & fd_{11}(k)e^{j\phi_2} \\ fc_{22}(k)e^{j\phi_3} & fd_{22}(k)e^{j\phi_4} \end{bmatrix}^{-1} \begin{bmatrix} X_{in1}(k) \\ X_{in2}(k) \end{bmatrix} \quad (16)$$

$$\begin{bmatrix} T_{21}(k) \\ T_{22}(k) \end{bmatrix} = \begin{bmatrix} fc_{11}(k)e^{j\phi_1} & fd_{11}(k)e^{j\phi_2} \\ fc_{22}(k)e^{j\phi_3} & fd_{22}(k)e^{j\phi_4} \end{bmatrix}^{-1} \begin{bmatrix} Y_{in1}(k) \\ Y_{in2}(k) \end{bmatrix} \quad (17)$$

At step 708, a merged channel estimate for the optical signal is determined in a frequency domain. For example, the merged training matrices are applied to the vector representations of the training sequence to determine the merged channel estimate. For instance, the merged training matrices determined at step 706 are applied to the vector representations determined at step 704 to determine the merged channel estimate for the optical signal according to equations (16) and (17). The terms of the merged channel estimate are determined by performing a matrix vector multiplication of the merged training matrices with the vector representations of the training sequences of the optical signal. At step 710, optionally, the merged channel estimate is averaged over time. For instance, the merged channel estimate determined in step 708 is time-averaged across a plurality of received optical frames in the optical signal. Time-averaging the merged channel estimate across a plurality of received optical frames improves performance of the method 700 when the optical signal suffers from an impairment of noise.

FIG. 8 is an embodiment of a method 800 for channel equalization in an optical communications system. The method 800 is implemented in a device in an optical communication network for providing compensation for impairments in an optical signal according to a plurality of training sequences included in the optical signal. The method 800 may be implemented in the same device as the method 700, or may be implemented in a separate device. At step 801, a receiving module, for example a receiving module of an optical receiver, receives an optical signal comprising at least one datum and one optical signal impairment. At step 802, frequency domain representations of data included in an optical frame is determined. For example, frequency domain representations of data in an X-polarization component, such as the frame 302, and data in a Y-polarization component, such as the frame 304, of an optical signal are determined. The frequency domain representations are determined according to a FFT, for example, 64-point FFT modules 602 of the unit 600.

At step 804, a vector representation of the frequency domain representations of the data is determined. For example, a 2×1 vector representation is formed from the frequency domain representation of the data from the X-polarization component of the optical signal and the data from the Y-polarization component of the optical signal. The 2×1 vector is determined, for example, by the 2×1 vector module 604 of the unit 600.

At step 806, a delay is implemented in the method 800. Delaying the method 800 enables a channel estimate used by the method 800 at step 808 to be time-averaged over a plurality of frames of an optical signal, thereby improving performance in the presence of SOP rotation in the optical signal. An amount of delay implemented in the method 800 is determined according to specific implementation methods according to a desired number of frames over which the channel estimate is averaged. The delay is implemented, for example, by the delay buffer 606 of the unit 600.

At step 808, a compensated optical signal is determined in the frequency domain according to a channel estimate, such as a merged channel estimate according to method 700, and the optical signal. For example, the channel estimate is applied to the 2×1 vector representation of the data of the optical signal to compensate for impairments in the optical signal a create a compensated output. The channel estimate is received, for example, from a unit such as unit 500 that executes a method such as method 700. To determine the compensated output, the 2×1 vector representation of the frequency domain representation of data in the optical signal is multiplied with the channel estimation based on a matrix vector multiplication operation according to $$\begin{bmatrix} \hat{X}_{in}(k) \\ \hat{Y}_{in}(k) \end{bmatrix} = \begin{bmatrix} T_{11}(k) & T_{12}(k) \\ T_{21}(k) & T_{22}(k) \end{bmatrix}^{-1} \begin{bmatrix} X_{out}(k) \\ Y_{out}(k) \end{bmatrix}, \quad (18)$$

in which the matrix of $T_{11}(k)$, $T_{12}(k)$, $T_{21}(k)$, and $T_{22}(k)$ is the channel estimate received by the method 800, the matrix of $X_{out}(k)$ and $Y_{out}(k)$ is the 2×1 vector representation according to step 804, and the matrix of $\hat{X}_{in}(k)$ and $\hat{Y}_{in}(k)$ is a vector representation of the compensated output. The compensated output is determined, for example, by the module 608 of the unit 600.

Figure 9:
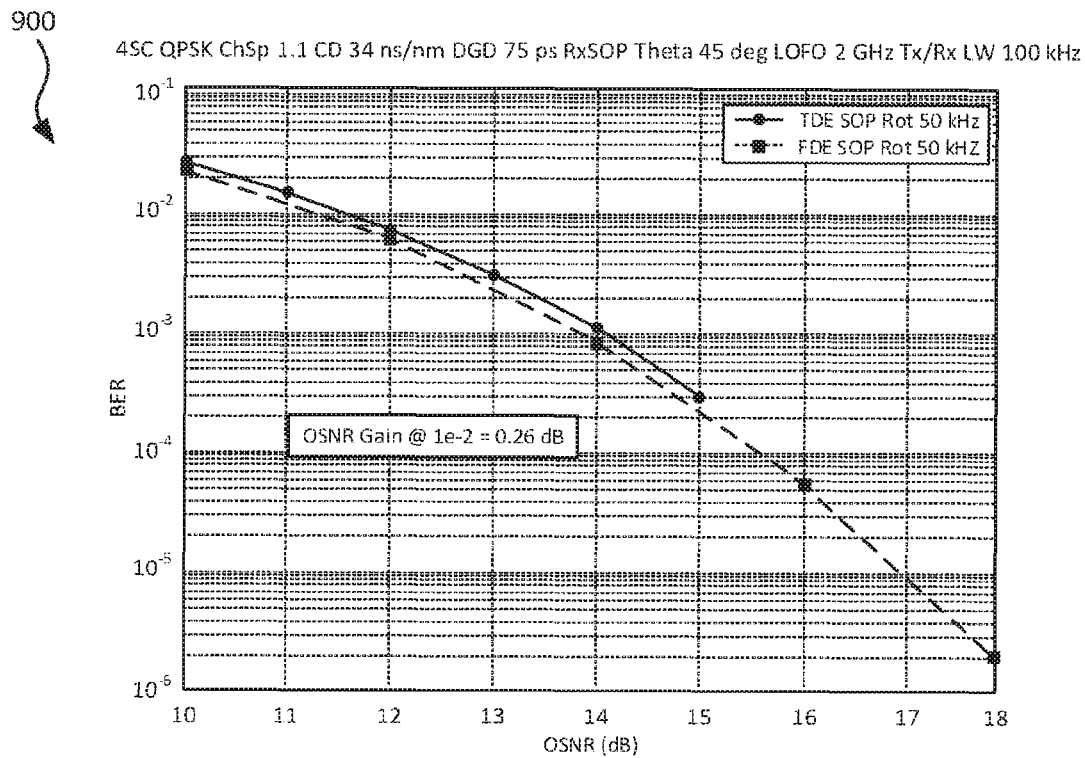
FIG. 9 is a graph of experimental performance of an embodiment of frequency domain equalization.

FIG. 9 is a graph 900 of experimental performance of an embodiment of frequency domain equalization. The graph 900 demonstrates a comparison of accuracy between a traditional time-domain equalization (TDE) method for a quadrature phase shift keying (QPSK) optical signal and a frequency domain equalization (FDE) method, for example, methods 700 and 800, according to the present disclosure. In the graph 900, a bit error rate (BER) is indicated by the Y-axis, and an optical signal-to-noise ratio (OSNR) in decibels (dB) is indicated by the X-axis. As is shown by the graph 900, for a QPSK optical signal having a CD of 34 nanoseconds per nanometer (ns/nm), a differential group delay of 75 picoseconds (ps), a receiver SOP (RxSOP) angle of 45 degrees, a LOFO of 2 gigahertz (GHz), a Tx/Rx laser line width of 100 kilohertz (kHz), an OSNR gain of 0.26 dB at a BER of 0.01, and an SOP rotation of 50 kilohertz (kHz), FDE methods have an accuracy comparable to TDE methods while also providing for operation over a wider OSNR range.

Figure 10:
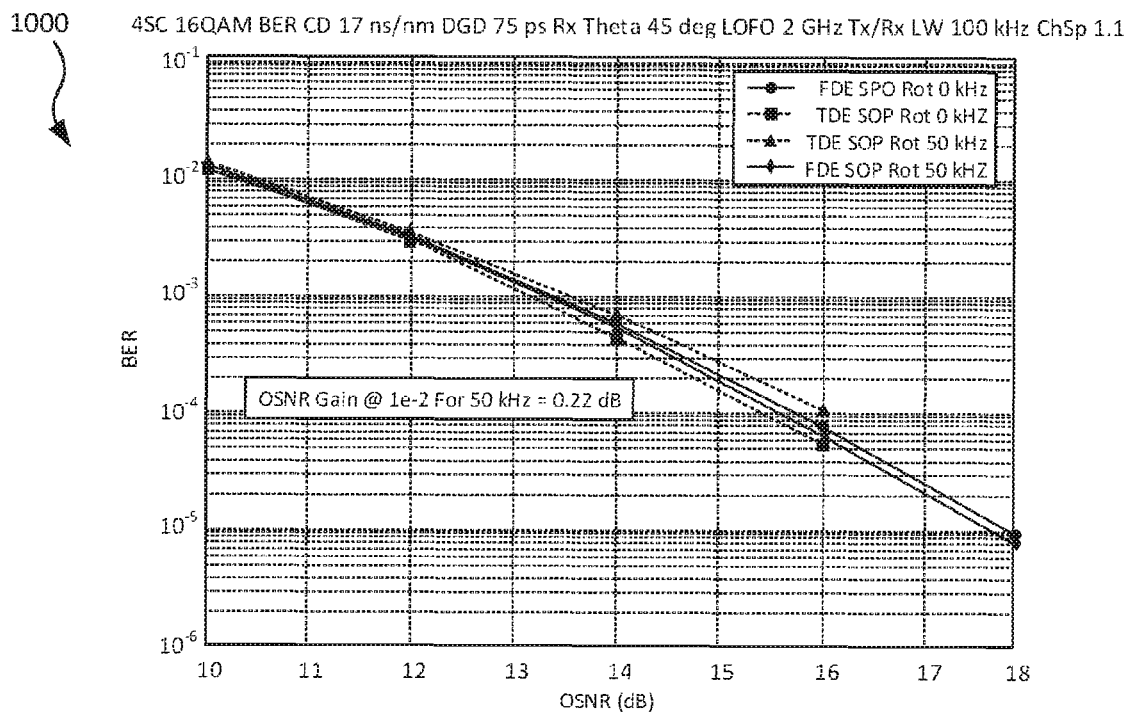
FIG. 10 is a graph of experimental performance of an embodiment of frequency domain equalization.

FIG. 10 is a graph 1000 of experimental performance of an embodiment of frequency domain equalization. The graph 1000 demonstrates a comparison of accuracy between the TDE method for a 16-quadrature amplitude modulation (16QAM) optical signal and the FDE method, for example, methods 700 and 800, according to the present disclosure. In the graph 1000, the BER is indicated by the Y-axis, and the OSNR in dB is indicated by the X-axis. As is shown by the graph 100, for a 16QAM optical signal having a CD of 34 ns/nm, a differential group delay of 75 ps, an RxSOP angle of 45 degrees, a LOFO of 2 GHz, a Tx/Rx laser line width of 100 kHz, an OSNR gain of 0.22 dB at a BER of 0.01, and SOP rotation of 50 kHz, FDE methods have an accuracy comparable to TDE methods while also providing for operation over a wider OSNR range. Further, the graph 1000 demonstrates consistently accurate performance of the FDE method in the presence of 50 kHz SOP rotation, as well as in the absence of SOP rotation.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical transceiver in an optical communications network, the optical transceiver comprising:
    a receiver configured to receive an optical signal comprising an X-polarization component that comprises a first frame and a Y-polarization component that comprises a second frame;
    a processor coupled to the receiver and configured to:
        determine, in a time domain, a phase estimate according to the first frame and the second frame;
        obtain a chromatic dispersion (CD) estimate value;
        determine, in a frequency domain, a channel estimate for the optical signal using a merged training matrix, wherein the merged training matrix is based on the phase estimate and the CD estimate value and is independent of a feedback loop; and
        determine a compensated optical signal according to the channel estimate; and
    a transmitter coupled to the processor and configured to transmit the compensated optical signal to a downstream component in the optical communications network.

2. An optical transceiver in an optical communications network, comprising:
    a receiver configured to receive an optical signal comprising an X-polarization component that comprises a first frame and a Y-polarization component that comprises a second frame;
    a processor coupled to the receiver and configured to:
        determine, in a time domain, a phase estimate according to the first frame and the second frame;
        determine a first frequency domain representation of a first training sequence having a first size and a third training sequence having a third size of the first frame according to a fast Fourier transform (FFT) of a fifth size;
determine a second frequency domain representation of a second training sequence having a second size and a fourth training sequence having a fourth size of the second frame according to the FFT of the fifth size, wherein the fifth size is larger than the first size, the second size, the third size, and the fourth size;
determine a first vector representation of the first frequency domain representation;
determine a second vector representation of the second frequency domain representation;
determine, in a frequency domain, a channel estimate for the optical signal according to a relationship between the first frame, the second frame, and the phase estimate;
determine a compensated optical signal according to the channel estimate; and
a transmitter coupled to the processor and configured to transmit the compensated optical signal to a downstream component in the optical communications network.

3. The transceiver of claim 2, wherein the processor is further configured to:
determine a training matrix according to the first training sequence, the second training sequence, the third training sequence, and the fourth training sequence; and
determine a modified training matrix according to the training matrix, a first phase of the first training sequence, a second phase of the second training sequence, a third phase of the third training sequence, and a fourth phase of the fourth training sequence.

4. The transceiver of claim 3, wherein the processor is further configured to determine a merged training matrix according to the modified training matrix and a chromatic dispersion (CD) estimate value.

5. The transceiver of claim 4, wherein the processor is further configured to further determine the channel estimate according to the merged training matrix, the first vector representation and the second vector representation.

6. The transceiver of claim 5, wherein the processor is further configured to time-average the channel estimate over a plurality of frames of the optical signal.

7. The transceiver of claim 6, wherein the processor is further configured to delay compensating the optical signal according to an amount of time corresponding to a period of time-averaging of the channel estimate and implemented in a delay buffer of the processor.

8. The transceiver of claim 5, wherein the processor is further configured to:
determine a third frequency domain representation of a first datum of the first frame and a second datum of the second frame; and
determine a third vector representation of the third frequency domain representation.

9. The transceiver of claim 8, wherein the processor is further configured to further determine the compensated optical signal according to the third vector representation.

10. A method implemented in an optical transceiver, the method comprising:
receiving, by a receiving module, an optical signal comprising at least one training sequence;
processing, by a processor and in a time domain, the optical signal to determine a frequency domain representation of the optical signal; and
determining, by the processor and in a frequency domain, a channel estimate for the optical signal according to the at least one training sequence and using a merged training matrix,
wherein the merged training matrix is based on a phase estimate and a chromatic dispersion (CD) estimate value and is independent of a feedback loop, and
wherein the channel estimate compensates in the frequency domain for a polarization mode dispersion (PMD) and a CD in the optical signal.

11. The method of claim 10, further comprising:
processing the optical signal in the frequency domain to determine a vector matrix representation of the optical signal;
processing the optical signal in the time domain to determine the phase estimate;
determining a training matrix according to the optical signal and the phase estimate; and
determining the channel estimate according to the training matrix and the vector matrix representation.

12. The method of claim 11, further comprising merging the training matrix with a predetermined CD estimate value before determining the channel estimate.

13. The method of claim 12, further comprising further determining the channel estimate by applying the training matrix to the training sequence of the optical signal.

14. The method of claim 11, further comprising averaging the channel estimate over a period of time of the optical signal.

15. A method implemented in an optical transceiver, the method comprising:
receiving, by a receiving module, an optical signal comprising at least one datum and at least one optical signal impairment;
processing the optical signal in a time domain to determine a frequency domain representation of the at least one datum; and
determining in a frequency domain, by a processor, a compensated optical signal according to the optical signal and a merged channel estimate,
wherein the merged channel estimate is based on a phase estimate and a chromatic dispersion (CD) estimate value and is independent of a feedback loop.

16. The method of claim 15, further comprising processing the at least one datum in the frequency domain to determine a vector matrix representation of the at least one datum.

17. The method of claim 16, further comprising further determining the compensated optical signal by applying the merged channel estimate to the vector matrix representation of the at least one datum.

18. The method of claim 17, further comprising delaying determining the compensated optical signal for a predetermined period of time corresponding to an amount of time over which the merged channel estimate is merged.

19. The method of claim 17, further comprising mitigating the effects of polarization mode dispersion (PMD) and CD using the merged channel estimate.

20. The method of claim 15, wherein determining the compensated optical signal does not occur in the time domain.

* * * * *

UNITED STATES PATENT AND TRADEMARK OFFICE
CERTIFICATE OF CORRECTION

PATENT NO. : 9,680,574 B1  
APPLICATION NO. : 14/954473  
DATED : June 13, 2017  
INVENTOR(S) : Murali Krishnan et al.

Page 1 of 1

It is certified that error appears in the above-identified patent and that said Letters Patent is hereby corrected as shown below:

On the Title Page

Page 2, (56) References Cited, U.S. Patent Documents, please add:
-- 8,385,747 B2 2/2013 Roberts, et al. --

Signed and Sealed this
Fifth Day of September, 2017

Joseph Matal
*Performing the Functions and Duties of the*
*Under Secretary of Commerce for Intellectual Property and*
*Director of the United States Patent and Trademark Office*